US012559380B2

(12) United States Patent
Hiranaka et al.

(10) Patent No.: US 12,559,380 B2
(45) Date of Patent: Feb. 24, 2026

(54) METHOD FOR COMPRESSION OF AQUEOUS SLURRY CONTAINING SOLID FOREIGN MATTER AND PAPER DUST, AND TREATMENT METHOD OF WASTE GYPSUM BOARD

(71) Applicant: Tokuyama Corporation, Shunan (JP)

(72) Inventors: Shingo Hiranaka, Shunan (JP); Kentarou Matsuo, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 508 days.

(21) Appl. No.: 18/012,100

(22) PCT Filed: Apr. 19, 2021

(86) PCT No.: PCT/JP2021/015913
§ 371 (c)(1),
(2) Date: Dec. 21, 2022

(87) PCT Pub. No.: WO2022/014115
PCT Pub. Date: Jan. 20, 2022

(65) Prior Publication Data
US 2023/0257277 A1      Aug. 17, 2023

(30) Foreign Application Priority Data

Jul. 14, 2020      (JP) ................................. 2020-120398

(51) Int. Cl.
*C01F 11/46*      (2006.01)
*B03B 5/48*      (2006.01)
*B09B 3/32*      (2022.01)
*C02F 11/125*      (2019.01)

(52) U.S. Cl.
CPC .............. *C01F 11/468* (2013.01); *B03B 5/48* (2013.01); *B09B 3/32* (2022.01); *C02F 11/125* (2013.01)

(58) Field of Classification Search
None
See application file for complete search history.

(56) References Cited

FOREIGN PATENT DOCUMENTS

JP      2020-065975 A      4/2020
WO      WO-2012176688 A1 *  12/2012   ............... B09B 3/32

OTHER PUBLICATIONS

Machine Translation of Matsuo (JP2020065975) (Year: 2020).*
Machine Translation of Hlranaka (WO-2012776688) (Year: 2012).*

* cited by examiner

*Primary Examiner* — Michael Forrest
(74) *Attorney, Agent, or Firm* — Keating & Bennett, LLP

(57) ABSTRACT

Aqueous slurry which includes solid foreign matter and paper dust is pressed by means of a screw press, provided with a mesh having openings not less than 1.5 mm and not greater than 3 mm, to separate the aqueous slurry into the solid foreign matter and the paper dust, and liquid component passing through the mesh. Then, the liquid component is sieved by means of a sieve having openings not greater than 1 mm to separate from the liquid component the solid foreign matter and the paper dust.

5 Claims, 3 Drawing Sheets

METHOD FOR COMPRESSION OF AQUEOUS SLURRY CONTAINING SOLID FOREIGN MATTER AND PAPER DUST, AND TREATMENT METHOD OF WASTE GYPSUM BOARD

FIELD OF THE INVENTION

The invention relates to a pressing method of aqueous slurry including solid foreign matter and paper dust and, in particular, a pressing method of gypsum slurry including solid foreign matter and paper dust and derived from waste gypsum boards.

BACKGROUND ART

Gypsum slurry derived from waste gypsum boards includes paper dust, metal pieces such as metal fittings, sand, gravel, and so on, in addition to gypsum. In this specification, solid foreign matter means, for example, metal pieces, sand, and gravel. For reclaiming gypsum from waste gypsum boards, it is needed to separate paper dust and solid foreign matter from gypsum.

Related pieces of the prior art will be described. According to Patent Document 1 (JP 2020-065975A), waste gypsum boards are crushed and heated so that gypsum therein is converted to gypsum hemihydrate or anhydrous type III gypsum. The resultant gypsum hemihydrate and/or the like are mixed with water to form a gypsum slurry, and gypsum dihydrate particles formed in the slurry are deposited in deposition tanks. The gypsum slurry is led to a foreign matter separator, and foreign matter in the slurry is deposited and separated, by the difference in the specific gravity between the gypsum slurry and the foreign matter. Further, the paper dust in the slurry is separated by a vibration sieve. Since the separated paper dust has high water content, this method further needs the dehydration of the paper dust. The inventors have considered separating paper dust and solid foreign matter more efficiently from gypsum slurry derived from waste gypsum boards. As a remark, it is also needed for other slurries which include solid foreign matter and paper dust, to separate the solid foreign matter and the paper dust efficiently from the slurries, similarly to the slurry derived from waste gypsum boards.

PRIOR DOCUMENT LIST

Patent Document

Patent Document 1: JP 2020-065975A

SUMMARY OF THE INVENTION

Problems to be Solved by the Invention

The inventors have considered pressing the gypsum slurry by belt presses or screw presses. During this consideration, it has been found that the retrieval of paper dust having low water content is difficult by belt presses and that screw presses can press more efficiently.

Screw presses press paper dust and solid foreign matter in the slurry towards the outlet of the press by means of vanes of the screw and eject the liquid component in the slurry through openings of a surrounding mesh. However, hard solid foreign matter in the slurry, such as metal pieces and gravel, frequently damaged the mesh, and therefore, the continuous operation of screw presses was found difficult.

The object of the invention is to reduce the damage to the meshes when pressing, by screw presses, aqueous slurry, such as gypsum slurry derived from waste gypsum boards, and to maintain the water content of the paper dust separated from the aqueous slurry within an allowable range.

Means for Solving the Problems

A pressing method of aqueous slurry, including solid foreign matter and paper dust, according to the invention is characterized by a pressing step for pressing said aqueous slurry by means of a screw press, provided with a mesh having openings not less than 1.5 mm and not greater than 3 mm, such that said aqueous slurry is separated into the solid foreign matter and the paper dust not passing through said mesh, and liquid component passing through said mesh, and a sieving step for sieving said liquid component by means of a sieve having openings not greater than 1 mm such that the solid foreign matter and the paper dust are separated from the liquid component.

A processing method of waste gypsum boards according to the invention carries out:

a deposition step for mixing gypsum hemihydrate and/or anhydrous type III gypsum, derived from waste gypsum boards with an aqueous medium to form a gypsum slurry including paper dust and solid foreign matter and then for depositing gypsum dihydrate particles in the gypsum slurry; and a solid/liquid separation step for extracting the gypsum dihydrate particles from the gypsum slurry.

The invention is characterized by further comprising:

a pressing step for pressing said gypsum slurry by means of a screw press, provided with a mesh having openings not less than 1.5 mm and not greater than 3 mm, such that said gypsum slurry is separated into the solid foreign matter and the paper dust not passing through said mesh, and a gypsum slurry passing through said mesh, and a sieving step for sieving said gypsum slurry passing through said mesh by means of a sieve having openings not greater than 1 mm such that the solid foreign matter and the paper dust are separated as oversized components from the gypsum slurry.

Screw presses and belt presses have been known as the pressing devices that can continuously press aqueous slurries. However, it has been found difficult to retrieve, by belt presses, paper dust that has low water content from aqueous slurries containing the paper dust. Further, when treating aqueous slurries containing solid foreign matter such as metal pieces, the belt in the presses is inevitably damaged. Therefore, according to the invention, a screw press is used to retrieve paper dust and foreign matter from the aqueous slurries.

Screw presses push aqueous slurries towards the outlet by a screw and eject the liquid component in the slurry from a mesh surrounding the screw. When the opening in the mesh is smaller, then, the paper dust and the foreign matter which are ejected with the liquid component are made smaller. However, since those meshes having small openings have to be thin, the meshes have to be frequently damaged by solid foreign matter. Therefore, the damage to the meshes is to be reduced.

According to the invention, the openings of mesh in the screw press (opening diameter) are made not less than 1.5 mm and not greater than 3 mm, preferably, not less than 2 mm and not greater than 3 mm. This enables the mesh to have a thickness of not less than 1.5 mm and not greater than 3 mm, preferably, not less than 2 mm and not greater than 3 mm Namely, since the openings in the mesh are made by punching, the thickness of meshes has an upper limit substantially equal to the openings. According to this invention, the openings in the mesh are made larger to enable the mesh to have an increased thickness such that the damage to the mesh is reduced. As a remark, when the openings in the mesh exceed 3 mm, the screw presses were easily clogged, and the retrieved paper dust and the foreign matter had high water content.

When using the mesh having an opening not less than 1.5 mm and not greater than 3 mm, the damage to the meshes is reduced, but the liquid component passed through the mesh becomes to include paper dust and foreign matter. Therefore, the liquid component passed through the mesh of the screw press is sieved by means of a sieve having openings not greater than 1 mm to separate the paper dust and foreign matter from the liquid component. Since large-sized solid foreign matter does not pass through the mesh in the screw press, the screen in the sieve is not damaged by the solid foreign matter. While the paper dust and the foreign matter not passing through the sieve have high water content, most of the paper dust and the foreign matter have already been removed from the liquid component by the screw press. Therefore, while the paper dust and the foreign matter treated by the sieve have high water content, the water content in the total of the retrieved paper dust and the foreign matter is within an allowable range.

When the openings of the sieve are made smaller, the water content in the paper dust and foreign matter is smaller. However, at the same time, the strength of the screen of the sieve decreases, and the screen becomes easily damaged by the solid foreign matter. Therefore, the opening in the screen is preferably not less than 0.4 mm and not greater than 0.8 mm.

According to the invention, damage to the mesh in the screw press is reduced, and paper dust and foreign matter are extracted from the aqueous slurry such that they have a water content within an allowable range. The slurries to be treated are not limited to those derived from waste gypsum boards but arbitrary if it is aqueous and contains paper dust and solid foreign matter.

BRIEF DESCRIPTION OF THE DRAWINGS

FIG. 1 A schematic diagram of a reclamation plant of gypsum dihydrate according to an embodiment FIG. 2 A partially cross-sectional view of a screw press used in the embodiment FIG. 3 A plan view of a mesh in the screw press FIG. 4 A cross-sectional view of the mesh in the screw press FIG. 5 A plan view of a mesh according to a modification FIG. 6 A plan view of a mesh according to a second modification

FEATURES FOR CARRYING OF THE INVENTION

Figure 2:
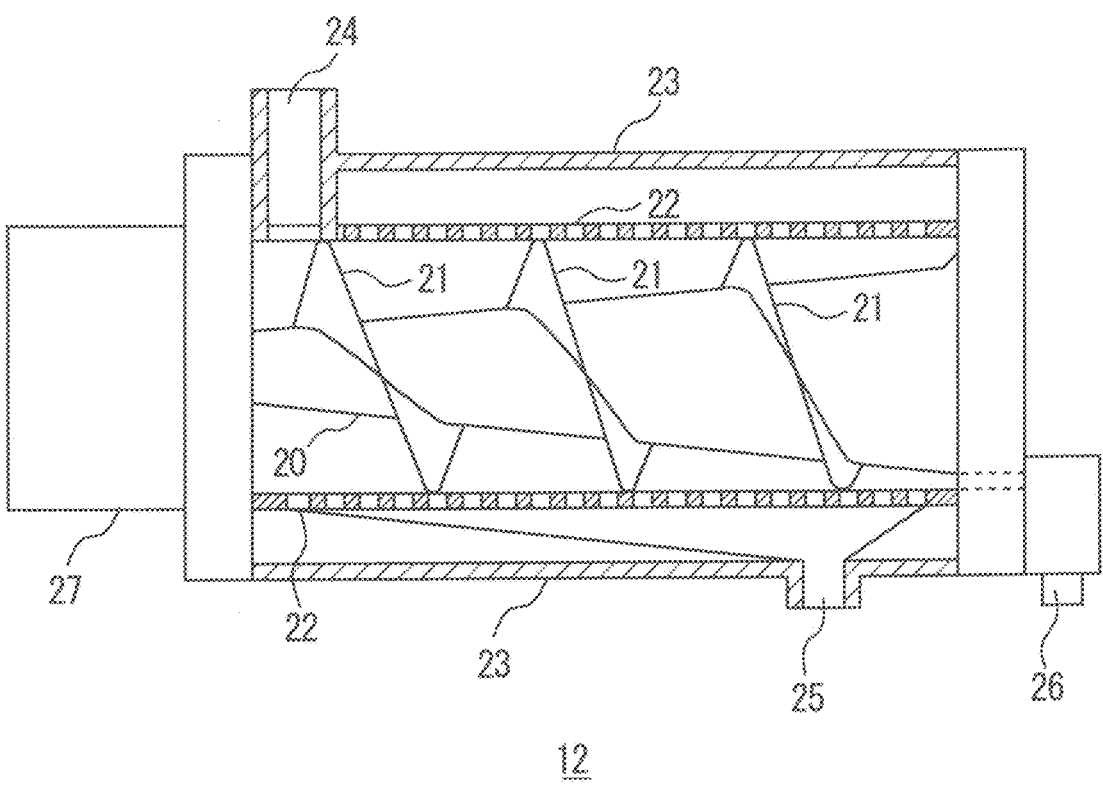

Embodiments for carrying out the invention will be described. The scope of the invention is determined according to the claims with reference to the specification and well-known techniques in the art, as the ordinary persons in the art understand the claims. The scope of the invention is not limited to the embodiments.

Embodiments

Figure 1:
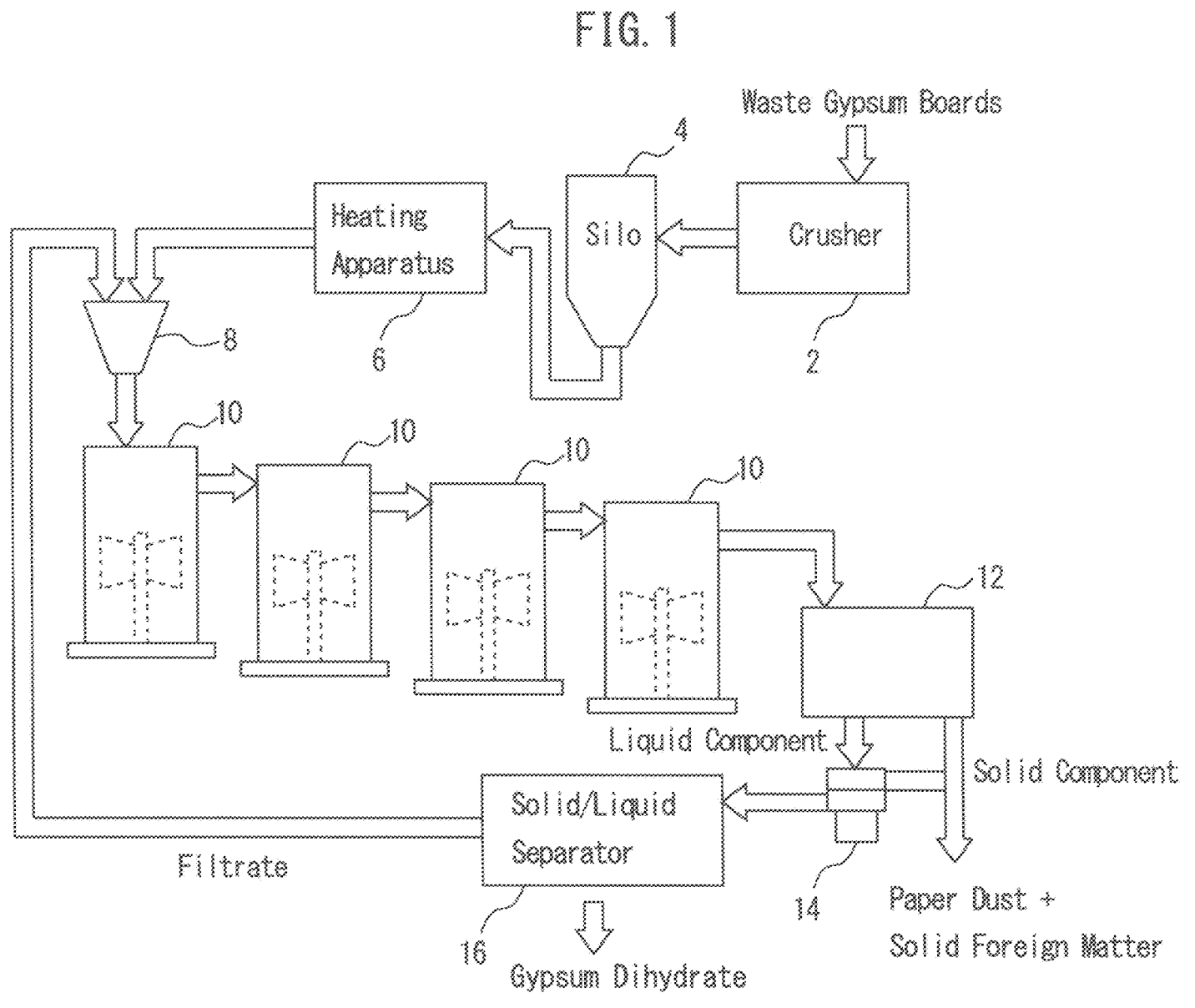

FIGS. 1 to 6 indicate an embodiment and its modifications. FIG. 1 indicates the processing of waste gypsum boards. The waste gypsum boards are crushed by a crusher 2, and if needed, they are pulverized after crushing. In addition, metallic foreign matter is separated by a magnetic separator, not shown in the drawings. Gypsum granules resultant from crushing are stored in a silo 4 and are heated in a heating apparatus 6 to prepare granules of gypsum hemihydrate or anhydrous type III gypsum. These granules include paper dust and solid foreign matter, such as metal pieces, sand, and gravel, even after crushing, pulverization, and magnetic separation, and the solid foreign matter is hard.

The gypsum granules are mixed with filtrate from a solid/liquid separator 16 in a mixing tank 8 to form a gypsum slurry, and the gypsum slurry is aged in deposition tanks 10 under stirring to deposit gypsum dihydrate particles in the gypsum slurry. Without the mixing tank 8, the gypsum granules and the filtrate may be directly mixed in one of the deposition tanks 10. While FIG. 1 indicates multi-staged deposition tanks 10, one stage tank or arbitrary staged tanks are however usable.

The gypsum slurry in the deposition tanks 10 is pressed by means of a screw press 12 to separate paper dust and foreign matter from the liquid component in the slurry. The liquid component passed the screw press 12 is dealt with a sieve 14 such as a vibration sieve, and paper dust and foreign matter are further separated from the liquid component as the oversized components. The paper dust and the foreign matter are obtained by both the screw press 12 and the sieve 14, then, for example, air dried, and separated into paper dust and solid foreign matter by a cyclone or the like.

The liquid component passed through the sieve 14 (the undersized component) is separated into the powder of gypsum dihydrate particles and the filtrate by the solid/liquid separator 16 such as a filter press, and the filtrate is re-circulated to the mixing tank 8. However, the liquid component passed through the sieve 14 may be re-circulated to the deposition tanks 10 or the like, and the gypsum slurry may be supplied to the solid/liquid separator 16 through a separate path.

FIG. 2 indicates the structure of the screw press 12. A screw shaft 20 is rotated by a driver 27, and vanes 21 mounted on the screw shaft 20 press the slurry from the left to the right in the drawing. A tubular mesh 22 provided with plural openings encloses the vanes 21. The diameter of the screw shaft 20 increases from the left to the right in the drawing, the gap between the mesh 22 and the screw shaft 20 decreases towards the right in the drawing, and thus the slurry is pressed. The mesh 22 is further enclosed by an outer tube 23. The gypsum slurry is supplied to the inside of the mesh 22 from an inlet port 24 at the left in the drawing, and the liquid component passed through the mesh 22 is evacuated from a liquid component outlet 25. The paper dust and foreign matter are transported to the right end of the mesh 22 by the screw shaft 20 and evacuated from a solid component outlet 26.

Figure 3:
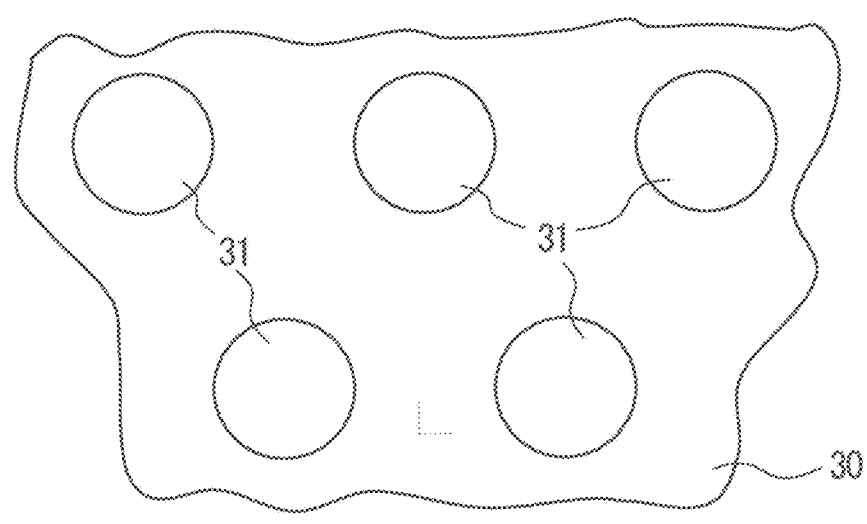
Figure 4:
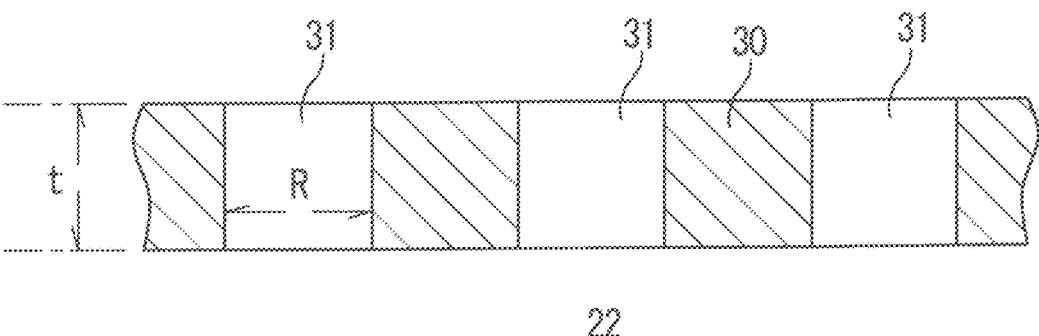
Figure 5:
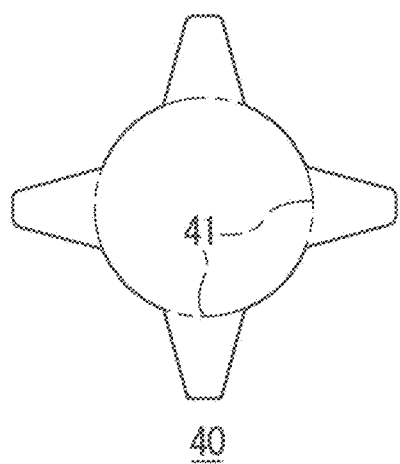
Figure 6:
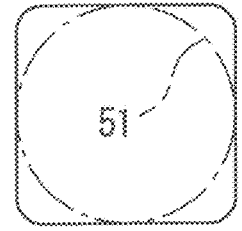

FIG. 3 indicates the plan view of the mesh 22, and FIG. 4 indicates its cross-sectional view. The mesh 22 comprises a metal plate 30 such as a steel plate and is provided with plural circular openings 31 by punching. When the thickness of the metal plate 30 is t, and the diameter of the openings 31 is R (opening diameter), the strength of the mesh 22 increases when the thickness t increases. When the thickness t becomes larger than the diameter R, the punching becomes difficult, and therefore, the thickness t is made nearly equal to the diameter R. For example, the value (t/R−1) is preferably made within plus and minus 0.2 and more preferably, within plus and minus 0.1. When the diameter R of the openings 31 was 1 mm or less, the mesh 22 was frequently damaged, and therefore, the diameter R is 1.5 mm or greater and preferably 2 mm or greater. When the diameter of the openings 31 exceeded 3 mm, the slurry was frequently clogged within the gap between the screw shaft 20 and the mesh 22, and the water content of paper dust ejected from the solid component outlet 26 increased. Therefore, the diameter R is made 3 mm or less, and the thickness t is, for example, preferably made 3 mm or less. The preferable ranges of the diameter R of the openings 31 and the thickness t are as follows:

Preferable Range: R: 1.5 mm or greater and 3 mm or less, t: nearly equal to R, 1.5 mm or greater, and 3 mm or less, More preferable Range: R: 2 mm or greater and 3 mm or less, t: nearly equal to R, 2 mm or greater, and 3 mm or less, In both cases: (t/R−1): at least −0.2 and at most 0.2, and more preferably, (t/R−1): at least −0.1 and at most 0.1.

When the openings 31 of the mesh 22 are not circular, the diameter of an incircle within the openings is defined as the opening diameter. For example, regarding an opening 40 in FIG. 5, the diameter of an incircle 41 shown by the chain line is defined as the opening diameter, and regarding an opening 50 in FIG. 6, the diameter of an incircle 51 shown by the chain line is defined as the opening diameter. When there are various sizes of the openings 31 or the like, the number of openings of diameter R is denoted as n (R). And then, {Sigma n (R)×R}/{Sigma n (R)}, or the number averaged opening diameter within the distribution of R is calculated as the average opening diameter.

The opening rate of the mesh 22 is defined as the total opening area of openings 31 divided by the apparent area of the mesh 22 (area including the openings 31). The opening rate is preferably 15% or greater and 30% or less. When the opening rate is made large, the water content in the paper dust and foreign matter decreases, and the strength of the mesh 22 decreases on the other hand.

Since the screw press 12 separates large solid foreign matter, there is little chance that the sieve 14 is damaged by solid foreign matter. In addition, the quantity of paper dust and the foreign matter gotten from the sieve 14 is by far smaller than those gotten from the screw press 12. Therefore, even if the paper dust and the foreign matter from the sieve 14 have high water content, the increase in the total water content in the paper dust and the foreign matter is small. Therefore, a coarse sieve 14 having an opening of 1 mm or less, preferably, from 0.4 mm to 0.8 mm, can be used. The screen of the sieve 14 is, for example, made of metal but may be made of plastic. When measuring the opening, the number of openings is measured by an optical microscope in a predetermined length, such as 1 inch, and the diameter of the metal wire or the like of the screen is measured by the same optical microscope or by a micrometer. When subtracting the diameter of the metal wire or the like multiplied by its number from the predetermined length and then dividing by the number of the openings, the opening of the sieve 14 is the resultant.

6

Experiment

A gypsum slurry having 10 wt % of paper dust and solid foreign matter in total (the total concentration of water and gypsum was 90 wt %) was pressed by means of a screw press 12 with a mesh 22 having an opening of 2 mm and the thickness of 2 mm at a rate of 550 Kg/hr. The solid component gotten from the solid component outlet 26 had a dry weight of 54 Kg/hr, the adhering water was 36 Kg/hr, and the water content was 40 wt %. The liquid component gotten from the liquid component outlet 25 was treated by a vibration sieve 14 having an opening of 0.5 mm. The resultant paper dust and foreign matter had a dry weight of 1 Kg/hr, the adhering water was 4 Kg/hr, and the water content was 80 wt %. In total, nearly all the paper dust and foreign matter were reclaimed at a rate of 55 Kg/hr, the adhering water was 40 Kg/hr, and the water content was 42 wt %. The paper dust and foreign matter were dried under air blow and were separated into solid foreign matter and paper dust by a cyclone.

Comparative Example

Replacing the mesh 22 in the screw press 12 with one having an opening of 0.5 mm (the thickness was also 0.5 mm), and the same slurry in the experiment was continuously pressed at a rate of 550 Kg/hr. The liquid component gotten from the liquid component outlet 25 had almost no paper dust nor foreign matter, and therefore, the treatment by the sieve 14 was not needed. However, when operating 80 hours from the start, the mesh 22 was damaged, and the screw press became inoperable.

LIST OF REFERENCE SYMBOLS

2 crusher
4 silo
6 heating apparatus
8 mixing tank
10 deposition tank
12 screw press
14 sieve
16 solid/liquid separator
20 screw shaft
21 vane
22 mesh
23 outer tube
24 inlet port
25 liquid component outlet
26 solid component outlet
27 driver
30 metal plate
31 opening
40, 50 opening
41, 51 incircle

What is claimed is:

1. A pressing method of aqueous slurry, including solid foreign matter and paper dust, comprising:
   a pressing step for pressing said aqueous slurry by means of a screw press, provided with a mesh having openings not less than 1.5 mm and not greater than 3 mm, such that said aqueous slurry is partially separated into the solid foreign matter and the paper dust not passing through said mesh, and liquid component passing through said mesh, and
   a sieving step for sieving said liquid component by means of a sieve having openings not greater than 1 mm to further separate the solid foreign matter and the paper dust from the liquid component.

2. A processing method of waste gypsum boards comprising:

a deposition step for mixing gypsum hemihydrate and/or anhydrous type III gypsum, derived from waste gypsum boards with an aqueous medium to form a gypsum slurry including paper dust and solid foreign matter and then for depositing gypsum dihydrate particles in the gypsum slurry; and a solid/liquid separation step for extracting the gypsum dihydrate particles from the gypsum slurry, wherein a pressing step for pressing said gypsum slurry by means of a screw press, provided with a mesh having openings not less than 1.5 mm and not greater than 3 mm, such that said gypsum slurry is partially separated into the solid foreign matter and the paper dust not passing through said mesh, and a gypsum slurry passing through said mesh, and a sieving step for sieving said gypsum slurry passing through said mesh by means of a sieve having openings not greater than 1 mm to further separate the solid foreign matter and the paper dust as oversized components from the gypsum slurry are performed after forming the gypsum slurry and before the solid/liquid separation step.

3. The processing method of waste gypsum boards according to claim 2, wherein the openings of said sieve are not less than 0.4 mm and not greater than 1 mm.

4. The processing method of waste gypsum boards according to claim 3, wherein a ratio (t/R) of a thickness t of said mesh and a diameter R of said openings is not less than 0.8 and not greater than 1.2.

5. The processing method of waste gypsum boards according to claim 4, wherein said mesh has an opening ratio which is a ratio of a total area of the openings and an apparent area of the mesh, not less than 15% and not greater than 30%.

* * * * *